Jan. 7, 1958          I. W. VICTOR          2,818,703
JET ENGINE FUEL, PRESSURE RATIO, AND NOZZLE AREA CONTROL
Filed July 1, 1954          2 Sheets-Sheet 2
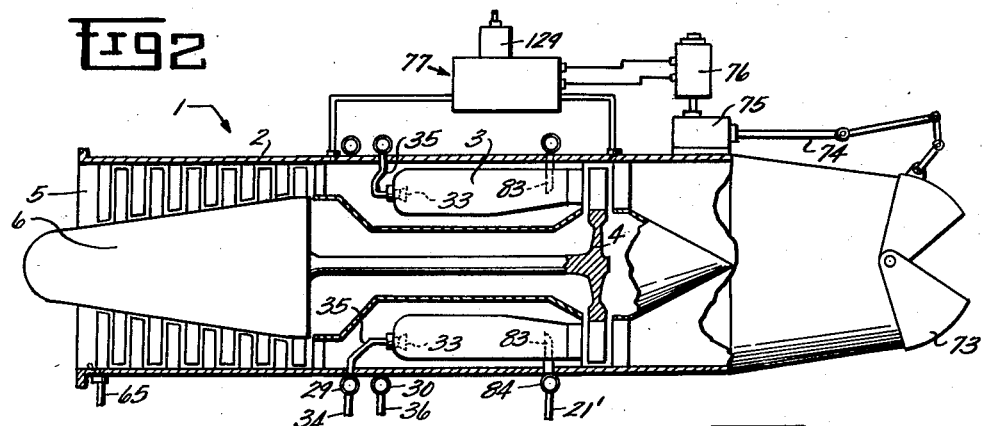
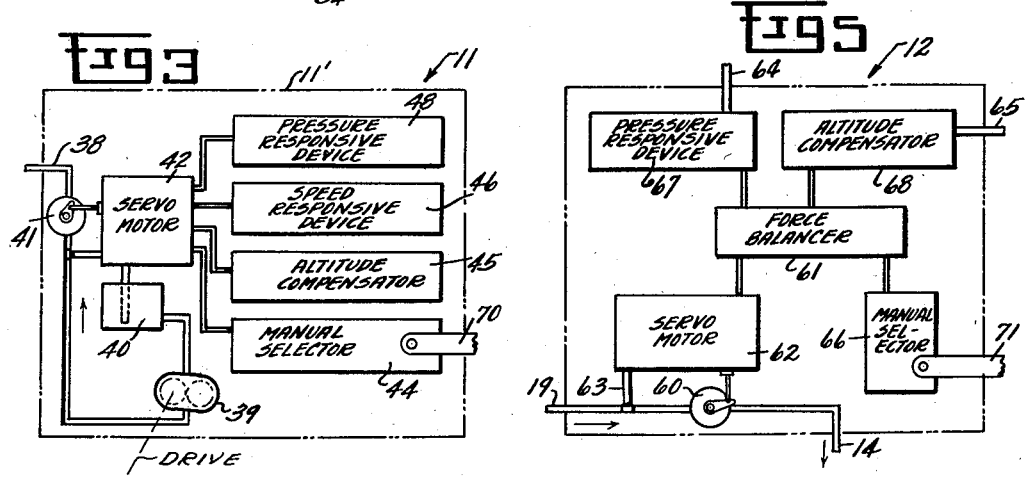
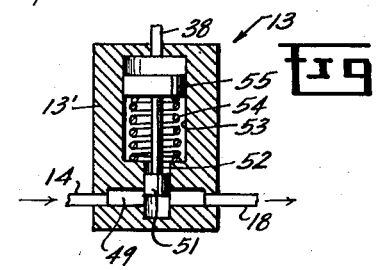
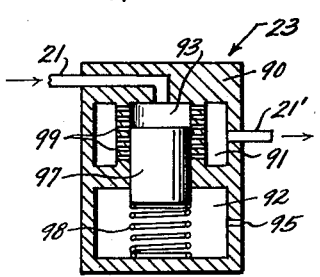
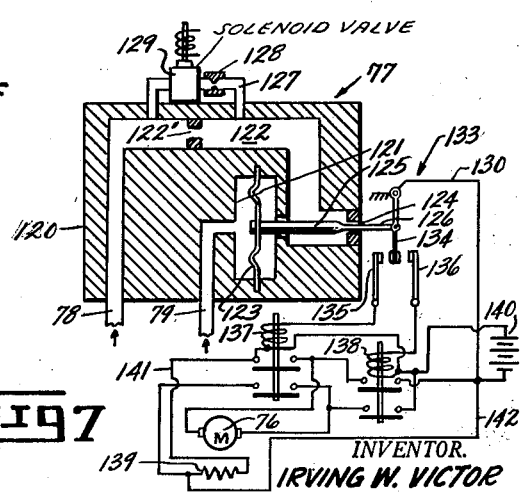
INVENTOR.
IRVING W. VICTOR
BY Maurice H. Klitzman
ATTORNEY United States Patent Office 2,818,703
Patented Jan. 7, 1958

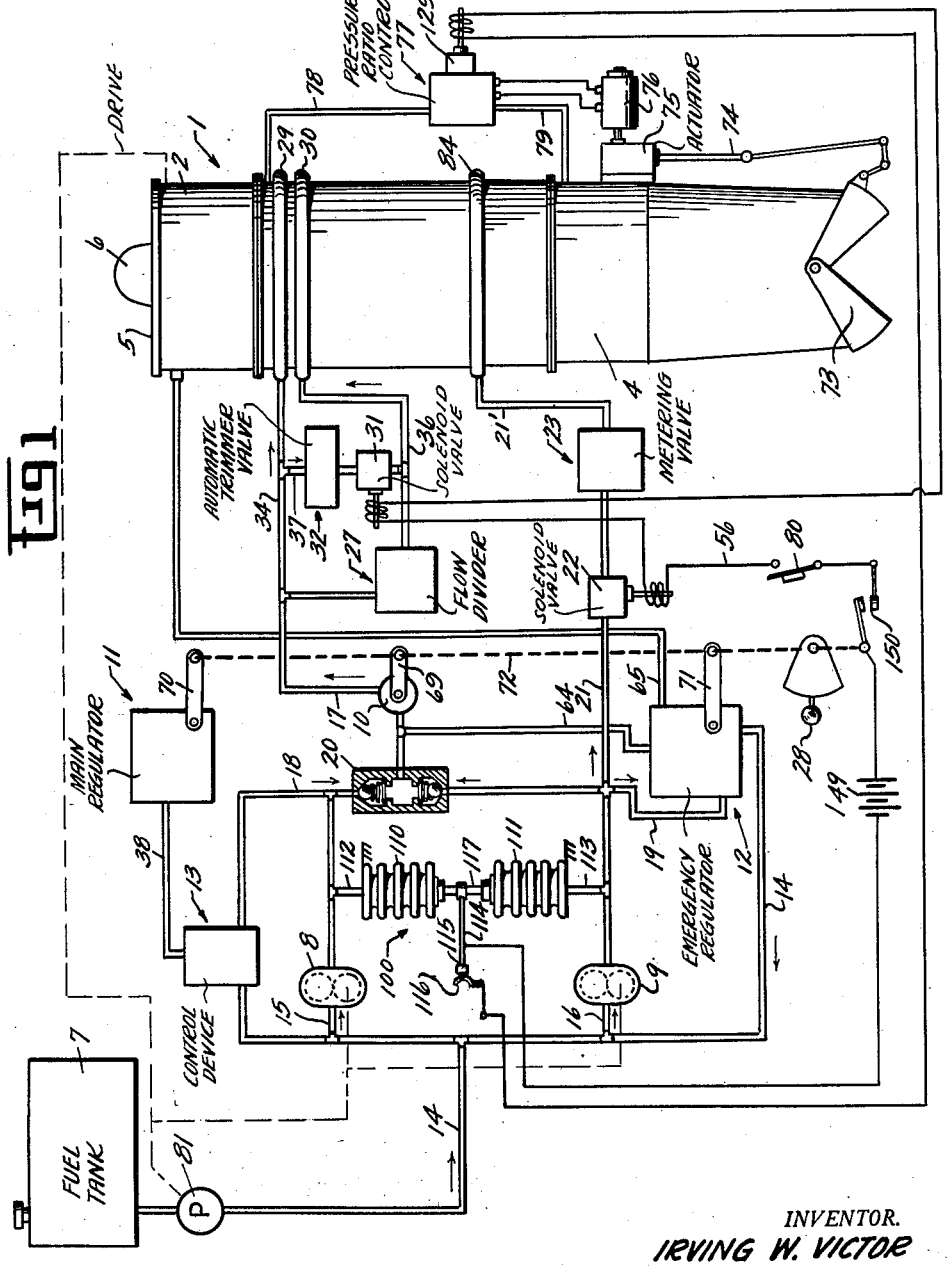

2,818,703

JET ENGINE FUEL, PRESSURE RATIO, AND NOZZLE AREA CONTROL

Irving W. Victor, Cincinnati, Ohio, assignor to General Electric Company, a corporation of New York Application July 1, 1954, Serial No. 440,698

3 Claims. (Cl. 60—35.6)

This invention relates to thermal powerplants, and, particularly, to control systems for aircraft propulsion powerplants having thrust augmenters.

Control of gas turbine powerplants for aircraft service presents an extremely difficult problem due to the various changes in operating conditions to which these powerplants are subjected. These variations may include a wide range of ambient atmospheric pressure, temperature, speed and load, thus requiring corresponding great changes in the rate of fuel supply. Thermal powerplants used for the propulsion of aircraft may comprise a compressor, combustion chambers, and a turbine arranged in series flow relation to keep the powerplant weight and over-all diameter to a minimum.

In many instances it has been found that combat-military aircraft are called upon to do more than that for which they were originally designed. Special military missions often demand extra bursts of speed for short periods of time. It is often important that aircraft have a high altitude ceiling and high rate of climb. In these instances it is desirable that additional thrust be made available without resorting to the use of an oversized powerplant with the attendant increase in dead weight. One type of thrust augmenter is an arrangement wherein auxiliary fuel is injected into the gas stream before the gas has reached the turbine, the added fuel being ignited and burning rearwardly of the turbine to give increased thrust. This type of structure is described with greater particularity in a co-pending application Serial Number 328,434 in the name of Gerald W. Lawson and John A. Benson filed on December 29, 1952 and assigned to the assignee of the present application. Although the structure in that application is described as an arrangement for igniting a conventional afterburner, it may be used alone as a thrust augmenter. The present control system is illustrated herein with an engine having a thrust augmenter of the type disclosed in the aforementioned Lawson et al. application.

An object of the invention is to provide a new and improved control system for a turbo-jet engine having an auxiliary or secondary fuel injection system.

Another object of the invention is to provide a control system for thermal powerplants having fuel injection thrust augmenters which system includes new and improved control means for starting and operating the powerplant under extreme altitude conditions.

Still another object of the invention is to provide a new and improved control system arrangement for aircraft service whereby efficient control and safe operation are assured even in the event of failure of components of the system; and the physical size of certain components is reduced, thereby resulting in substantial weight savings.

Other objects and advantages will be apparent from the following description taken in connection with the accompanying drawings in which Figure 1 illustrates a fuel control system arranged in accordance with the invention; Figure 2 shows the powerplant in more detail including the arrangement for variable jet nozzle control and Figures 3–7 are diagrammatic views of various control components for use with the system as shown in Figure 1.

Referring to Figures 1 and 2, a gas turbine powerplant 1 may comprise a compressor 2, combustion chambers 3, and a turbine 4 arranged in series flow relation. The compressor receives air through an inlet 5 from the ambient atmosphere and delivers it at increased pressure and temperature to the combustion chambers. Fuel is introduced and mixed with this air to form a combustible mixture which is then burned in the combustion chambers to raise the temperature of the air to a still higher level before it is delivered to the turbine. This high-temperature, high-pressure air is utilized as motive fluid for driving the turbine which extracts at least sufficient power from the fluid to drive the compressor and certain accessories necessary to the operation of the powerplant. The remaining power is available for propulsion of the aircraft either as mechanical power for driving the propeller, or by discharging the fluid at high velocity relative to the aircraft as in a jet-propelled aircraft. Powerplants of this type are usually provided with an accessory section 6, comprising suitable mounting pads and gearing for driving various accessories, for example, fuel and lubrication pumps. Mechanical details of such plants are not material to an understanding of the present invention and are more particularly described in U. S. Patent 2,432,359—Streid, 2,479,573 and in co-pending application S. N. 541,565 filed June 22, 1944 now U. S. Patent 2,711,074, in the name of Alan Howard and assigned to the assignee as the present invention.

My improved control system includes a fuel tank or reservoir 7, at least two pumps 8, 9 connected in parallel, a shut-off valve or stopcock 10, a regulating device 11 referred to herein as the main regulator, a second regulating device 12 referred to herein as the emergency regulator, a control valve 13, a manual control lever 28, a flow divider 27, an automatic trimmer valve 32, a solenoid operated bypass valve 31, a solenoid operated shut-off valve 22, a metering valve 23, a pressure ratio control 77, and jet nozzle actuator 75.

*Arrangements of system components*

The pumps 8 and 9 in conduits 15 and 16 respectively, are connected in parallel to fuel tank 7 by a common inlet conduit 14 including a booster pump 81 to which are connected branch discharge conduits 15, 16. The branch conduits 15, 16, are connected to a double-check valve 20 on the discharge side of the pumps 8 and 9. The double-check valve 20 permits flow of fuel to the conduit 17 from whichever of the conduits 15 and 16 contains the higher pressure. Connection between main fuel burning system of the powerplant 1 and the common discharge conduit 17 is established through the shut-off valve 10 and flow divider 27. Fuel is supplied to each combustor through a nozzle 33 projecting into one end of each combustor and connected to fuel manifolds 29 and 30. Because of the wide range of operating loads to be obtained, the fuel-burning system is of a type adapted to provide a rate of fuel flow which changes as a predetermined function of the fuel pressure in the supply conduit 17, over a wide range of pressures. The main fuel burning system shown comprises a direct connection 34 from the main supply conduit 17 to the high pressure manifold 29, a second connection 36 through a metering valve or "flow divider" 27 to the low pressure manifold 30 and suitable branch connections 35 from the manifolds to the respective fuel nozzles 33. This kind of fuel burning system including flow divider 27 is more fully disclosed in U. S. Patent 2,590,853—Fulton which is assigned to the same assignee as the present application. The automatic trimmer valve 32 and solenoid operated bypass valve 31 are connected in series flow relation across conduits 34 and 36 leading to the high-pressure manifold 29 and low-pressure manifold 30 respectively.

Connection between the thrust augmenter auxiliary fuel burning system and the discharge conduit 21 is established through the solenoid shut-off valve 22 and fuel metering valve 23. Fuel is injected in the flow path through auxiliary nozzles 83 which extend through the transition liners of alternate combustion chambers 3. The nozzle arrangement is more fully described in the co-pending application of John A. Benson et al. previously referred to. Fuel is supplied under pressure to the auxiliary fuel nozzles 83 from a manifold 84 which is connected to the discharge conduit 21'.

Pumps 8, 9, and 81 are secured to suitable mounting pads (not shown) and are driven by the powerplant. During normal operation of the powerplant, fuel is drawn from the fuel tank 7 by the booster pump 81. Pump 8 delivers fuel under pressure through conduit 17 to the fuel burning system including the flow divider 27. When the thrust augmenter is in operation, pump 9 delivers fuel under pressure to the auxiliary fuel burning system through the conduit 21 and 21'.

Since the powerplant must operate under variable operating conditions, the rate of fuel flow required by the main and auxiliary fuel burning system may vary over a wide range. Fuel delivered by the pumps in excess of the requirements of the powerplant is returned to the pump inlets, or the fuel tank by a bypass arrangement. Control device 13 and emergency regulator 12 perform the function of bypassing excess fuel at a controlled variable rate. Fuel which is bypassed by control 13 is returned therefrom to the common inlet line 14 through conduit 18. Fuel which is bypassed by the emergency regulator is returned therefrom to the common inlet line 14 through the conduit 19. The construction and operation of such control device, which may be used in my improved fuel system, will be more fully described hereinafter.

Fuel pumps

My improved fuel system does not require the use of variable displacement pumps. Any desired type of constant displacement pump may be employed so that the weight and complexity are reduced and reliability is greatly improved. Since the pumps are connected to the powerplant, as previously indicated, the rotational speed plus the rate of fuel delivered by the pumps is a function of the rotational speed of the powerplant.

Main fuel regulator

The purpose of the main fuel regulator is to control the rate of fuel flow to the powerplant as a function of the position of the operator's control lever 28 and thus secure a desired output of the power plant. A number of condition-responsive devices are provided to vary a control pressure generated by the regulator automatically in response to changes in certain operating conditions of the powerplant, as well as mechanism for manipulation by the operator to select the desired load output of the powerplant.

Referring now to Figure 3, the condition-responsive devices in the regulator vary the control pressure output of the regulator in accordance with a preselected schedule in response to certain operating conditions which may include a manual selector control 44, a pressure responsive device 48 arranged to sense an operating pressure at any desired location between the discharge of said pumps and the powerplant, a speed responsive device 46 arranged to sense rotational speed of the powerplant, and an altitude compensating device 45 arranged to recalibrate the regulator so that a given position of the operator's control 28 always produces a predetermined percentage of full-load rating of the powerplant irrespective of altitude.

Within the regulator is a control oil pump 39 which furnishes pressurized oil to the servo-motor 42 and a regulating valve 41. Pump 39 obtains its oil from the reservoir 40 located within the regulator casing 11'. Signals from the condition-responsive devices are transmitted to the servo-motor 42 which effects positional changes in valve 41 to vary the variable control pressure output 38 of the regulator. Referring again to Figure 1, the variable control pressure output of the regulator is connected to control 13 by conduit 38. Variations in the control pressure are thus obtained to supply a suitable signal to control 13 which effects the change in the rate of bypass fuel flow in accordance with the operating needs of the power plant. A regulator of this type is described in greater detail in U. S. Patent 2,622,393—Edwards et al. and assigned to the assignee of the present application.

Control device

A suitable control device 13 which may be employed is illustrated diagrammatically in Figure 4. The control includes a casing number 13' having an internal passage 49 communicating with conduits 14 and 18. An adjustable valve 51 having a stem 52 is provided in series with passage 49. As illustrated, valve 51 is a piston-type valve, but it will be obvious that other types of valves may be employed with equally good results. Connected to valve stem 52 is a piston 55 arranged to slide in a cylinder 53 provided within casing 13'. A compression spring 54 is provided to bias piston 55 and valve 51 to the open position of the valve. Valve 51 is shown in a nearly open position in Figure 4. The cylinder 53 communicates with conduit 38 so that the variable control oil pressure output from regulator 11 is sensed by piston 55. As the control oil pressure increases, piston 55 and valve 51 are caused to move down thus restricting the flow of fuel through passage 49. Piston 55 will continue to move until the control oil pressure force exerted against the piston is exactly balanced by the force of the deflected biasing spring 54. Likewise, as the control oil pressure decreases, spring 54 causes the piston and valve to move upward until the spring force and the oil pressure force are again in balance. A similar control device is described with greater particularity in a co-pending application, S. N. 104,962, filed July 15, 1949, now U. S. Patent 2,695,055, in the name of Ira G. Cruckshank and assigned to the assignee of the present application.

Emergency regulator

Emergency regulator 12 is a second device for controlling the rate of flow of fuel through the main supply conduit 17 in the event of malfunctioning of main regulator 11.

Referring now to Figure 5, a number of condition-responsive devices which may include a device 67 responsive to a pressure appurtenant to the operation of the power plant, an altitude compensating device 68 and a manually adjustable device 66 for preselecting a desired rate of bypass fuel flow are provided for influencing the functioning of a valve 60 which is connected in series in bypass conduit 14. These condition-responsive devices are connected together by suitable linkages to form a force-balancing system 61. When the forces acting on the force-balancing system 61 become unbalanced, as a result of a change in signal from one or all of the condition-responsive devices 66, 67, and 68, one of the linkage members is caused to move so as to impart positional changes to a pilot valve which is part of the servo-motor 62 for effecting positional changes of valve 60. The actuating fluid for servo-motor 62 is the fuel delivered by pumps 8 and 9 as indicated by branch conduit 63 which connects the servo-motor to conduit 19.

Pressure responsive device 67 is arranged to sense the pressure of the fuel delivered to the powerplant. As illustrated in the drawings, pressure responsive device 67 is connected to conduit 17 by conduit 64 at a location immediately preceding the location at which conduit 17 is connected to the powerplant. It is to be understood, however, that conduit 64 may be connected to conduit 17 at any desired location between the powerplant 1 and control 13. Altitude compensating device 68 is arranged to sense the ambient atmospheric pressure by conduit 65 which connects the compensator to any desired location for sensing ambient pressure. For purposes of illustration and not of limitation, conduit 65 is shown as being arranged to sense the pressure at the inlet 5 of the powerplant. A regulator suitable for use in my improved fuel system is described with greater particularity in U. S. Patent 2,598,674—Burgess, which is assigned to the assignee of the present application.

Main fuel shut-off valve

The main fuel shut-off valve 10 is intended for use in the wide-open and closed positions only. The lever 69 and linkage indicated by broken line 72 is provided so that movement of the operator's control 28 is also transmitted to the shut-off valve. The linkage members are proportioned so that the valve is quickly moved to the full-open position during approximately the first ten degrees of movement of the operators control lever. Valves of this type are more particularly described in U. S. Patents 2,486,349—Barr and 2,510,617—Barr, which are assigned to the assignee of the present application. Connecting linkage of the type described is more particularly described in the Edwards et al. patent previously referred to.

Manual control

Lever members 69, 70, 71 and linkage 72 in Figure 1 connect the emergency regulator 12, main regulator 11 and stopcock 10, so that motion imparted to the adjusting means by any one of these components is likewise imparted to other components. The operator's control lever 28 is connected to linkage member 72 at any convenient location. Thus, any positional changes effected in the operator's control lever will be imparted to all three control components of the fuel system.

Solenoid operated shut-off valves

The solenoid operated fuel shut-off valves 22 and 31 are intended for use in the wide-open and closed positions only. These valves are of a common type being spring-loaded to the closed position. An electrical solenoid on the valve operates to open the valve against the spring force when electrical energy is supplied to the solenoid. When electrical energy is removed from the solenoid, the force of the spring causes the valve to be closed. As is shown in Figure 1, the solenoid operated valves 22 and 31 are connected electrically in series with an arming switch 150 by an electrical conductor 56 across a source of electrical voltage 149. The switch 150 on the engine throttle linkage is connected in series with an actuator switch 80. Switch 150 closes when the throttle reaches the normal full power position. Closing the actuator switch 80 energizes a solenoid which simultaneously opens the fuel shut-off valve 22 in the conduit 21 and the bypass valve 31 which is in the conduit 37 which runs between the high pressure and low pressure manifold supply lines 34 and 36 respectively.

Jet nozzle control

Referring to Figure 2, the engine is provided with a variable area jet nozzle 73, the mechanical details of which are not essential to the understanding of the present invention. The opening of the variable area jet nozzle 73 is controlled by an electric motor 76 which operates through a suitable gearing and linkage arrangement 75 and 74 to control the position of the nozzle 73. The electric motor 76 is in turn controlled by a pressure ratio control 77. Referring to Figure 7, the pressure ratio control comprises two pressure chambers 121 and 122, separated by a movable diaphragm 123 within a casing 120. Chamber 121 is connected to conduit 79 which senses the pressure of the gases at the turbine exhaust. Chamber 122 contains a reference pressure created by a flow of air entering through conduit 78, which is connected to the compressor discharge section of the engine, passing through a first orifice 122' and escaping through a second orifice 124. The area of the second orifice 124 is controlled by a tapered needle 125 which is suitably attached to the flexible diaphragm 123. An extension 126 on the tapered needle 125 actuates single pole double throw switch 133 for controlling the electric motor 76. A conduit 127 is provided to bypass the orifice 122' which includes a solenoid shut-off valve 129 and orifice 128.

The components of the control 77 are adjusted so that when the desired ratio of the pressures in conduits 78 and 79 exists, the pressures in the chamber 121 and 122 acting upon the diaphragm 123 maintain the diaphragm in its neutral midpoint position. Under these conditions, the needle 125 is positioned by the diaphragm 123 so that the effective flow of the second orifice is a comparable equivalent to the effective flow area of the jet nozzle of the engine. If for any reason whatever the desired ratio of the pressures sensed by the conduits 78 and 79 is upset, the diaphragm 123 and needle 125 are moved, changing the effective flow area of the orifice 124. This change in effective flow area causes the intermediate pressure in the chamber 122 between the orifices 122' and 124 to be changed to a value equal to the new pressure sensed by the conduit 79, and the diaphragm assumes a deflected position. The diaphragm 123 will remain in this deflected position as long as the ratio of the pressures in conduits 78 and 79 differ from the desired value.

The extension 126 on the movable needle 125 is arranged to move an electrical contact 134 between two stationary contacts 135 and 136 of the electrical switch 133. The arrangement is such that when the diaphragm is deflected in one direction contact is established between contacts 134 and 135 and when the diaphragm is deflected the other way, contact is established between contacts 134 and 136. When the diaphragm is in its neutral position none of the switch contacts make contact with any of the others. The contact 133 is connected electrically to one side of a source of electrical voltage by an electrical conductor 130. Contacts 135 and 136 are electrically connected to the pickup coils of electrical relays 137 and 138 respectively. The other side of the pickup coils of relays 137 and 138 are permanently connected to the other side of the voltage source 140. Each of the relays 137 and 138 have two pairs of normally open electrical contacts which are closed when electrical voltage is applied to their respective pickup coils. The contacts or relay 137 are connected between the source of electrical voltage 140 and the motor armature 76 in such a way as to connect the armature across the voltage supply when the relay 137 is energized. The contacts of relay 138 are also connected between the motor armature 76 and voltage supply 140 in such a way as to connect the armature across the voltage supply when the relay 138 is energized. It will be noted that the polarity of the armature is reversed when relays 137 and 138 are energized. The motor field 139 is connected directly across the voltage supply 140 by conductors 141 and 142 so that the polarity of the field is never changed with respect to the supply.

Thus it will be seen that when the diaphragm 123 is deflected by an error in the ratio of the pressures sensed by conduits 78 and 79 the switch 133 will close picking up either relay 137 or 138, energizing the motor armature 76 causing the motor to rotate changing the opening of the nozzle 73 until the proper pressure ratio is restored.

As will be explained later, it is desirable to lower the ratio of pressures maintained by this arrangement when the thrust augmenter is in operation. This is accomplished by opening the solenoid shut-off valve 129 when the thrust augmenter is in operation. By opening the valve 129, the orifice 122' is bypassed by the conduit 127 including the orifice 128 so that the effective area of the restriction between the inlet conduit and the chamber 122 is increased, thereby raising the reference pressure within the chamber 122. The ratio of pressures that will be maintained in the conduits 78 and 79 is thereby reduced to a lower value.

Differential pressure switch

The purpose of the differential switch 100 is to shut off the auxiliary fuel burning system in the event that the differential in the fuel pressures in conduits 18 and 19 varies appreciably from the desired value. The switch comprises two pressure bellows 110 and 111 which are mechanically interconnected by a rod 117. The bellows 110 communicates with conduit 18 through conduit 112 and the bellows 111 communicates with conduit 19 through conduit 113. Connected to the rod 117 is a member 114 which carries an electrical contact 115. The contact 115 is arranged to make electrical contact with a second contact 116 when the bellows arrangement is in its neutral position. The arrangement is designed so that whenever the difference in the pressures sensed by conduits 112 and 113 varies more than a predetermined value, the resulting movement of the member 114 will cause the electrical contact between contacts 115 and 116 to be interrupted thereby interrupting electrical continuity therebetween.

Fuel metering valve

The fuel metering valve 34 regulates the fuel pressure supplied by the emergency regulator 12 in order to obtain the desired fuel flow through the auxiliary nozzles 83 associated with the thrust augmenter. A valve suitable for this purpose is illustrated diagrammatically in Figure 6. The valve comprises a valve casing 90 having internal passages 91 and 92 and a cylinder 93. The passage 91 communicates with conduit 21', the passage 92 is vented to atmosphere through an opening 95 and the upper end of cylinder 93 communicates with conduit 21. A piston 97 is arranged to slide within the cylinder 93. A compression spring 98 is provided to bias the piston 97 to the upper end of the cylinder 93. A plurality of openings 99 in the wall of the cylinder 93 provides means for communication between the cylinder 93 and the passage 91. In operation, fluid is supplied under pressure to the valve through conduit 21. The pressure of the fluid against the upper surface of the piston 97 causes the piston to move in a downward direction against the biasing force of the compression spring 98. As the piston moves downward the openings 99 in the wall of the cylinder 93 are uncovered providing communication between the cylinder 93 and the passage 91. The farther the piston moves in the downward direction, the more openings 99 are uncovered so that the effective flow area between the cylinder 93 and passage is increased. By properly sizing and spacing the openings 99 the flow area may be designed to increase with downward motion of piston in accordance with any desired relationship. Accordingly, since the position of the piston 97 is dependent upon the pressure of the fluid supplied through conduit 21, the valve provides an effective flow area which varies with inlet pressure. Referring again to Figure 1, a valve of this type is used for the metering valve 23 in the conduit 21 between the pump 9 and the auxiliary fuel manifold 84. The emergency regulator 12 controls the pressure of the fuel in the conduit 21 between the pump 9 and the inlet of the metering valve 23. As the pressure of fuel at the inlet to the metering valve increases, the piston in the valve uncovers openings in the cylinder wall inside the valve to provide the desired effective flow area and consequent pressure drop across the valve as a function of the inlet pressure. In this manner, the desired fuel flow through the auxiliary fuel nozzles 83 may be obtained as a function of the pressure set by the emergency regulator 12.

Automatic trimmer valve

The automatic trimmer valve 32 operates to reduce the flow of fuel through the conduit 37 when pressure in conduit 34 falls below a predetermined value. A valve suitable for this purpose is also illustrated diagrammatically in Figure 6. Referring to Figures 1 and 6, the valve is installed in the system so that the conduit 21 coincides with the portion of conduit 37 which extends between conduit 34 and the valve 32, and the conduit 21' coincides with the portion of the conduit 37 between the valve 32 and the solenoid shut-off valve 31. The valve is designed so that when the pressure in conduit 34 falls below a predetermined value, the piston 97 will move in an upward direction to begin to cover the openings 99 in the wall of the cylinder 93. As the pressure in conduit 34 continues to fall, the piston continues to move upward thereby reducing the flow of fuel through the conduit 37.

Operation

During normal operation and with the pilot's control lever 28 in any position beyond the first 10–20 degrees of its travel so that the stopcock 10 is in the open position, fuel is pumped from the fuel tank by pumps 8 and 81 to the powerplant through connecting conduits 15 and 17. The rate of fuel flow is automatically governed by regulator 11 in accordance with the preselected output determined by the position of the operator's control lever 28. If operating conditions change, or if the pilot selects a new position of the control lever, the condition responsive devices in regulator 11 co-act to produce a change in the variable control oil pressure output of the regulator. This change in magnitude of the variable control oil pressure acting on control 13 effects the required change in the position of valve 51, thus increasing or decreasing the rate of flow of bypassed fuel to conduit 14 which in turn decreases or increases the rate at which fuel is delivered to the powerplant through conduit 17.

The emergency regulator 12 is scheduled to call for fuel pressures delivered to the stopcock 10 in accordance with the pressure schedule of the regulator 11. However, the schedule of pressures called for by the regulator 12 is arranged to be slightly less than those called for by the regulator 11 for any given operating condition, so that under normal conditions valve 60 is open to a greater degree than the valve 51 and the fuel delivered to the powerplant is under the control of the main regulator 11.

If regulator 11 becomes inoperative temporarily, or in the event of its complete failure, the pressure in conduit 19 will exceed that in conduit 18 causing the double check valve to change position so that fuel flows from conduit 16 to conduit 17 and emergency regulator 12 automatically provides a controlled and uninterrupted supply of fuel at the proper pressure to the powerplant.

When the throttle lever 28 is advanced to the full open position the arming switch 150 connected to the engine throttle linkage 72 is closed. Then when the actuator switch 80 is closed electrical power will be supplied through conductor 56 to the solenoids of the valves 22, 31, and 129 which causes them to be opened simultaneously. By opening the solenoid operated valve 22, fuel is permitted to pass through the conduit 21 to the metering valve 23. Primary scheduling of fuel flow to the thrust augmenter is accomplished by the emergency regulator 12. The flow of fuel is controlled by the emergency regulator 12 which sets a fuel pressure as a function of altitude and aircraft speed. This pressure in turn is regulated by the metering valve 23 which sets the correct manifold pressure for the particular flight condition.

By opening the valve 129, the value at which the ratio of compressor discharge pressure to turbine discharge pressure is maintained by the pressure ratio control is reduced. As will be explained presently, this pressure ratio is reduced to increase the thrust produced by the engine when the augmentor is in operation.

It is well known by those skilled in the art that the total energy that can be extracted from the hot gases leaving the main combustion chambers of the engine is a function of the temperature of the gases at the inlet to the turbine section and the ratio of the pressure at that section to the pressure of the ambient atmosphere. The energy which is converted into useful thrust by the jet nozzle is primarily a function of the temperature of the gases in the jet nozzle and the ratio of the pressures across the nozzle. The temperature of these gases is increased by means of the auxiliary fuel burner previously described. To further increase the thrust, the pressure ratio across the jet nozzle 73 is increased by reducing the ratio of the pressure at the compressor discharge to that at the turbine discharge maintained by the pressure ratio control 77 when the thrust augmenter is in use. The result of a reduction in the pressure ratio across the turbine will be for the turbine speed to decrease. The speed responsive device 46 in the main fuel regulator will provide a signal to the servo motor 42 resulting in increased fuel flow in response to a decrease in speed. By increasing the fuel supply to the main fuel burning system the increased temperature at the turbine inlet will tend to offset the loss in energy in the gases available for extraction by the turbine which results from the decrease in turbine pressure ratio. Because of control characteristics related to acceleration of the engine, the maximum fuel flow that can be supplied under normal circumstances is limited to a predetermined value which is independent of turbine speed. Since the fuel flow required by the main fuel burning system to maintain the desired engine speed when the thrust augmenter is in use is in excess of this predetermined value, the solenoid bypass valve 31 is provided in conduit 37 to bypass flow from the high pressure manifold supply conduit 34 to the low pressure manifold supply conduit 36 to provide increased fuel flow when the thrust augmenter is in use.

The automatic trimmer valve 32 operates to reduce the amount of fuel bypassed through the conduit 37 at very high altitudes. It is necessary to reduce the fuel flow schedule at very high temperatures to prevent excessive temperatures. Therefore, the automatic trimmer valve 32 is provided to cut down the bypass flow through the conduit 37 at very high altitudes. The trimmer valve operates to reduce the bypass flow when the pressure in conduit 34 falls below a predetermined value which exists only at very high altitudes.

In the event of a malfunction of any of the components in either the main or auxiliary fuel supply systems the difference between the pressures in conduits 18 and 19 will vary appreciably from the normal. Under these conditions, it is desirable to shut down the supply of fuel to the auxiliary fuel supply system for safety reasons. For this reason the pressure switch 100 is provided to open the electrical circuit including the solenoids of valves 22, 31, and 129, thereby causing these valves to be closed rendering the auxiliary fuel burning system inoperative when the difference in the fuel pressure in conduits 18 and 19 varies appreciably from a predetermined value. As was previously explained the schedule of fuel pressure called for by the regulator 12 is arranged to be slightly less than that called for by the regulator 11 for any given operating condition, so the fuel pressure in conduit 18 will normally exceed that in conduit 19 by a small amount.

Various modifications of the preceding arrangements will suggest themselves to those skilled in the art, and it will be obvious that the invention is not limited to the specific embodiments described, but is capable of much wider application, and it is intended to cover in the appended claims all such changes and modifications that come within the true spirit and scope of the invention.

What I claim as new and desire to secure by Letters Patent of the United States is:

1. In combination with a thermal powerplant comprising a compressor, combustion device, turbine variable area exhaust section in series flow relation and having a primary and an auxiliary fuel burning system, the combination of a fuel reservoir, fuel pumping means, conduit means including fuel flow regulating means connecting said fuel pumping means to said primary fuel burning system, conduit means including a shutoff valve connecting said fuel pumping means to said auxiliary fuel burning system, means for sensing the fluid pressure at the compressor discharge, means for sensing the fluid pressure of the gases at the turbine exhaust, means responsive to the ratio of said compressor discharge pressure to said turbine exhaust pressure to control the area of said variable area discharge section to maintain said ratio at a first predetermined value when said shutoff valve is open and to maintain said ratio at a second predetermined value when said shutoff valve is closed.

2. Apparatus in accordance with claim 1 wherein said primary fuel burning system includes means to cause greater flow of fuel thereto when said shutoff valve is open than when said shutoff valve is closed.

3. A thermal powerplant comprising a compressor, a combustion device, a turbine and a variable area jet nozzle in series flow relation, a primary fuel burning system, an auxiliary fuel burning system fuel supply means for said primary fuel burning system, fuel supply means for said auxiliary fuel burning system, including a shutoff valve, means for opening and closing said shutoff valve, a pressure ratio sensing device which senses the ratio of the pressure of the air at the compressor discharge to the pressure of the gases at the turbine exhaust, control means for varying the area of the variable jet nozzle to maintain the ratio of pressures sensed by the pressure ratio sensing device at a predetermined value, means for changing the predetermined value of the ratio of pressure maintained by said pressure ratio sensing device and control means so that a lower value is maintained when said shutoff valve is closed than when it opens and means for increasing the flow of fuel to said primary fuel burning system when said shutoff valve is closed.

References Cited in the file of this patent

UNITED STATES PATENTS

| | | |
|---|---|---|
| 2,520,967 | Schmitt | Sept. 5, 1950 |
| 2,570,591 | Price | Oct. 9, 1951 |
| 2,566,373 | Redding | Sept. 4, 1951 |
| 2,652,813 | Reuter et al. | Sept. 2, 1953 |
| 2,683,349 | Lawrence | July 13, 1954 |
| 2,739,441 | Baker et al. | Mar. 27, 1956 |